Aug. 19, 1969      D. A. KELLY      3,461,849

RADIAL/ROTARY-DUAL MODE-INTERNAL COMBUSTION ENGINE

Filed Jan. 9, 1968      3 Sheets-Sheet 1

INVENTOR.

Donald A. Kelly

INVENTOR.
Donald A. Kelly

Aug. 19, 1969     D. A. KELLY     3,461,849

RADIAL/ROTARY-DUAL MODE-INTERNAL COMBUSTION ENGINE

Filed Jan. 9, 1968     3 Sheets-Sheet 3

INVENTOR.

Donald A Kelly

3,461,849
RADIAL/ROTARY—DUAL MODE—INTERNAL COMBUSTION ENGINE
Donald A. Kelly, 58—06 69th Place,
Maspeth, N.Y. 11378
Filed Jan. 9, 1968, Ser. No. 696,575
Int. Cl. F02b 57/04, 53/00
U.S. Cl. 123—16            6 Claims

ABSTRACT OF THE DISCLOSURE

A radial/rotary I.C. engine comprising multiple piston/vanes which are fitted with longitudinal through holes and centrifugal check valves. The object of the centrifugal check valves is to allow radial piston operation at low speed, high torque conditions, and rotary vane operation at high speeds.

A variation of the engine design would provide external control of a gate valve located at the base of each radial transfer bore which transfers air pressure to the rotor periphery to provide a thrust vector.

Dual mode operation for a radial/rotary I.C. engine is projected as a means of providing maximum speed and torque range versatility with optimum economy of operation.

---

This invention relates to a radial/rotary internal combustion engine of the multiple piston/vane type, in which the rotary power vanes also function as radial pistons to provide augmented torque, or essentially two rotary engine types in one engine.

This rotary engine differs from previously disclosed multiple piston/vane rotary engines in that either, or both radial piston or rotary vane mode of operation can be achieved to suit the various operating conditions.

One method described is an automatic change of mode by the application of a centrifugal check valve in each of the piston vanes. In this arrangement the engine would meet low-speed, high torque demand running in radial piston mode and as increasing speed is required the centrifugal valves in each piston/vane would open to allow the air pressure to enter the peripheral rotor cavity, thereby increasing the rotary compression ratio with the engine running in rotary vane mode. A manual or external control mode change is outlined in which a gate valve controls the flow of air pressure from the base of the piston slot to the rotor periphery. The gate valve opens and closes the transfer bores by moving through them and is controlled by central control which enters the top of the hollow drive shaft. The control rod is fitted with a ball bearing cone cam which acts at right angles on the valve rod connected to the gate valve. The valve rod is spring loaded to constantly engage the valve rod end on the cone cam, which revolves with the drive shaft.

The piston/vanes are restrained by ball bearings which run in circular grooves in the end plates, so that the vane lips and seals revolve in close proximity with the inside walls of the cylinder housing but do not touch them at any point during rotation.

The primary object of most current rotary engine effort is to obtain high compression ratios at a minimum of sealing friction, so that the highest possible operating efficiencies will be reached. The currently operational rotary engines exhibit a "turbining" effect with their best output obtained at high r.p.m.'s and with the torque curve falling off rapidly at lower speeds.

While it is reasonable to accept this limitation for most applications, it is desirable to obtain low speed torque performance for many heavy duty applications.

Most of the current I.C. rotary engines provide efficient vane sealing in order to obtain high compression ratios, but in so doing inherit seal wear and lubrication problems.

Some types of free rotary I.C. engines do not attempt to seal the vanes, but rather run in contact with no seal, or with slight clearance between the vane tips and the housing bore walls with resulting compression loss. This radial/rotary engine is somewhat in between these two types, but with controlled seal contact so that excessive seal wear will not be a handicap. The piston/vanes are fitted with Teflon or Viton interlocking sealing strips which contain the pressure of the compressed air volume. The end plate inner faces form the sealing sides for the rotor slots with the rotor fitting closely between the end plate faces so that there is a minimum or no pressure loss in operation.

Baffling would be accomplished by the upper shaped portions at the vane top and sides. These shaped portions would tend to contain the rapidly expanding gases on ignition by deflecting the pressure surge inward toward the rotor periphery. The effectiveness of the baffling shapes in restricting pressure loss is contingent on the lip angles and the seal contact pressure.

The radial/rotary engine is foreseen as attractive for a wide range of applications in view of its speed and torque range capability and would be particularly adapted to automotive applications.

The design utilizes simple geometric shapes and since the output shaft is concentric with the rotor manufacturing costs can be kept relatively low.

The engine does not require expensively formed components and makes use of a maximum of simply machined parts wherever possible.

It is likely that the radial/rotary engine may be evolved to exceed the high power-to-weight ratios of the current gas turbines in its class, and exceed the economy of the I.C. engines in its class, at lower initial and lower operating costs.

The performance of the engine may be improved by joining two units in a tandem arrangement, in which case fuel economy would probably be enhanced.

The rotary portion of the engine does not present too difficult a cooling problem, but the internal radial piston/vanes do present an unusual and complex cooling problem. Additional cooling of the vanes and rotor slot walls will be by forced air flow through a hollow drive shaft and internal cavities within the rotor.

Lubrication of the internal piston/vanes will be accomplished by the use of an oil-in-fuel mixture along with Teflon sealing strips on the piston/vanes. A forced oil lubrication system may be necessary where the other methods prove insufficient.

In the rotary section complete combustion within the compressed instant cavities will be achieved by the use of multiple spark plugs over the entire combustion area. In addition to raising the operating efficiency of the engine complete combustion will lower the toxic and noxious level of the exhaust in support current anti-air pollution programs.

Ball bearings are secured to the piston/vane sides which run in the circular grooves in the end plates assure that the piston/vane radial sweeping position is constant in relation to the cylinder bore and thereby there is no undue radial load imposed on the top seal strip. The piston/vane radial position is set so that the top seal strips run at .001 to .005 clearance to the cylinder bore. The rolling contact of the bearings with the outside diameter of the grooves are adjustable so that the aforementioned clearance is maintained. These ball bearings are subjected to high radial loading and high speeds and will require meeting rigid standards.

The piston/vanes in this radial/rotary engine are wider and there are fewer than in previously disclosed rotary designs, so that larger compression volumes can be realized. In order to maintain rotor integrity the number of these vanes must be decreased, with five being an optimum number for most arrangements.

The wider piston/vanes make it possible to build in the centrifugal check valves and baffling offsets in the transfer bores which are required for automatic change of operational mode. The wider piston/vanes also make possible the use of multiple interlocking sealing strips for more effective sealing in the rotary mode of operation.

The interlocking sealing strips are fitted into corresponding grooves in the top and along the sides of the piston/vanes. The interlocking sealing strips of Teflon or Viton provide the close sealing of the compressing gas volume required for efficient high compression operation in the rotary section.

The multiple piston/vanes are set into close-fitting slots in the rotor and thereby guided in their radial displacement as the rotor revolves. The depth of the rotor slot is based on the piston/vanes being fully retracted into them at the combustion or flush position with a slight clearance at the bottom of the vanes.

The rotor of the engine must be hollow or built-up of ribs and sectors to keep the overall weight of the engine within desirable limits.

For the rotary section cooling requirements, axial holes will be provided within the cylindrical housing wall which should be closely spaced for cooling efficiency. Parallel coolant flow through the holes will be required for maximum heat transfer. Corresponding in-line holes will be located in the end plates, with the gaskets providing sealing, so that the coolant flows through the entire engine width at the combustion area. Coolant jackets will be required at the top and bottom of the engine for additional cooling requirements.

The principal object of the invention is to provide manual or automatic control of the radial piston section to gain maximum balanced torque range capability.

It is an object of the invention to produce a rotary I.C. engine with the highest possible power-to-weight ratio at the lowest possible cost.

It is an object of the invention to produce a basically simple rotary I.C. engine with a minimum of frictions in the operating components.

It is an object of the invention to build a rotary I.C. engine which achieves maximum possible combustion within the combustion cavities to reduce to a minimum the noxious and toxic level of the exhaust gases.

It is a final object of the invention to produce a simple rotary engine with a minimum number of operating parts for ease of production replacement and maintenance.

Other features and possible variations of the engine will become apparent from the following description of the radial/rotary engine. It should be understood that variations may be made in the detail engine design without departing from the spirit and scope of the invention.

Figure 1:
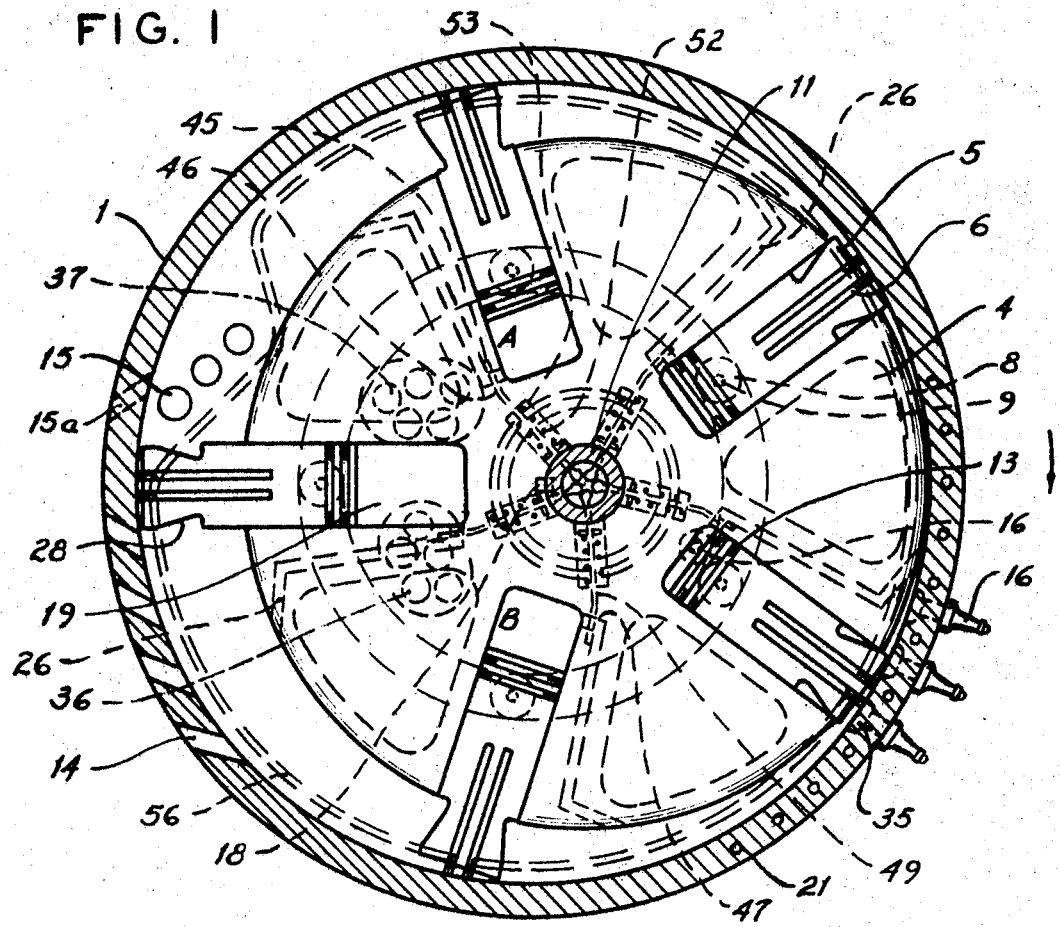
FIGURE 1 is a top sectional view of the radial/rotary engine with manual mode control.
Figure 2:
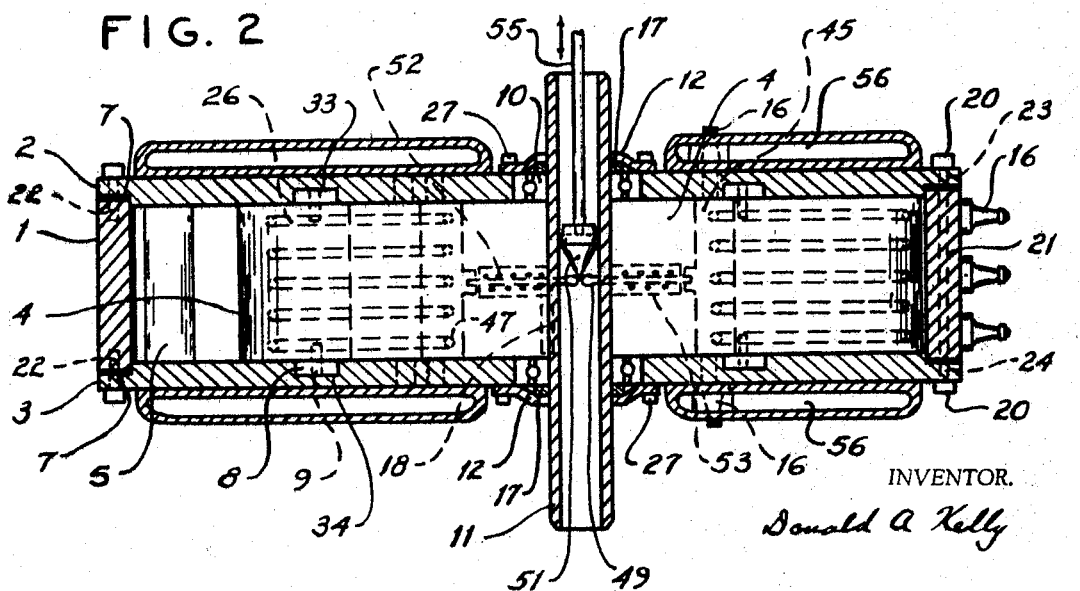
FIGURE 2 is a side sectional view through the engine with manual mode control.
Figure 3:
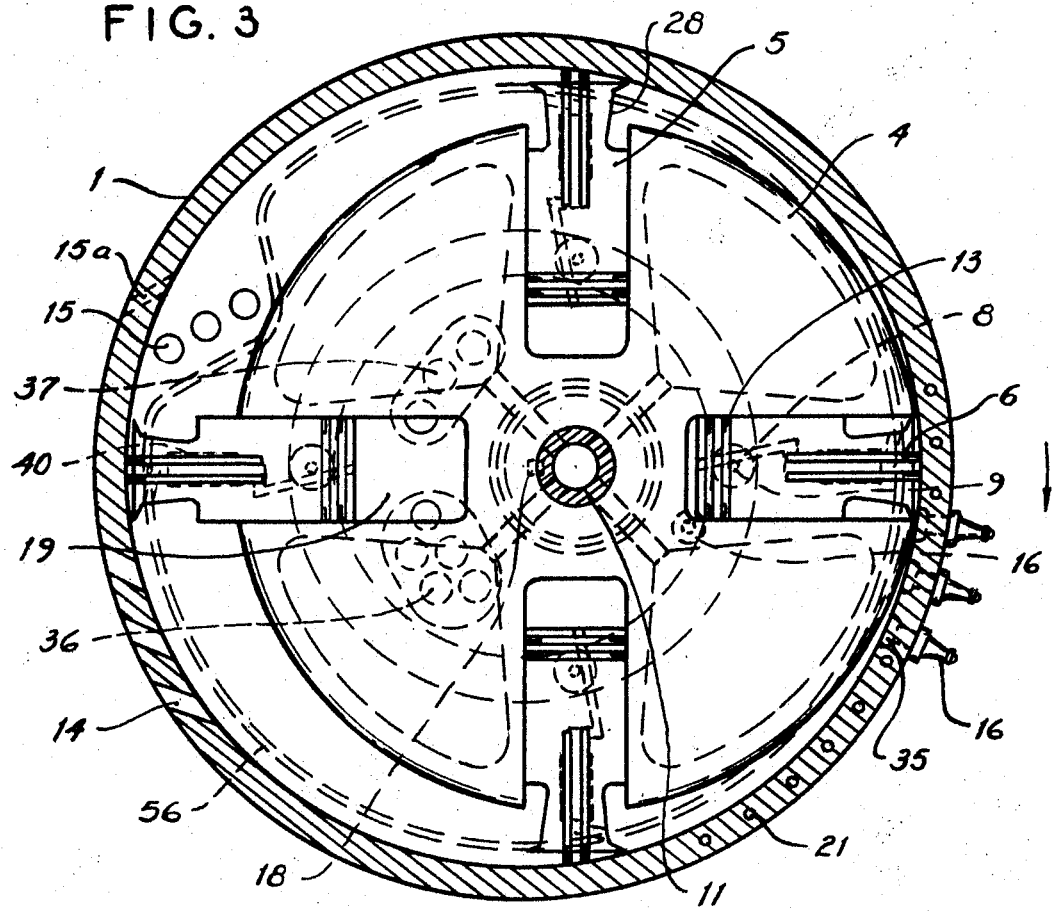
FIGURE 3 is a top sectional view of the radial/rotary engine with automatic radial piston control.
Figure 4:
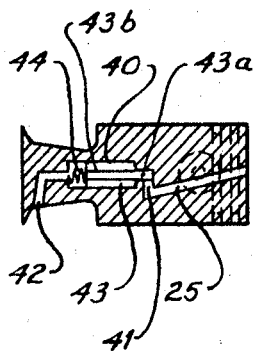
FIGURE 4 is a section through a piston/vane with internal check vales.
Figure 5:
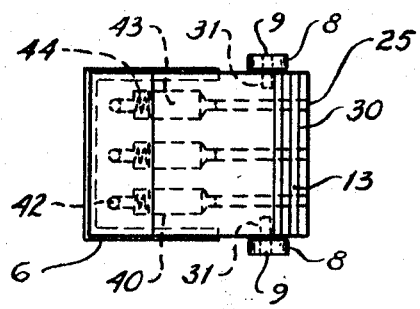
FIGURE 5 is a side view of a piston/vane with internal check valves.
Figure 6:
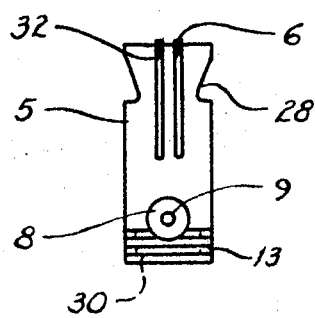
FIGURE 6 is a top view of a plain piston/vane.
Figure 7:
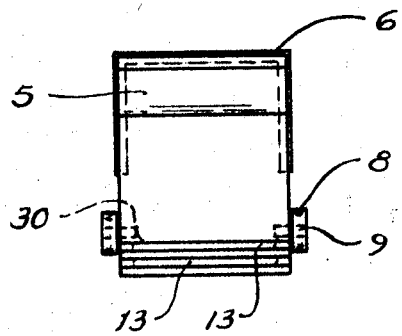
FIGURE 7 is a side view of a plain piston/vane.
Figure 8:
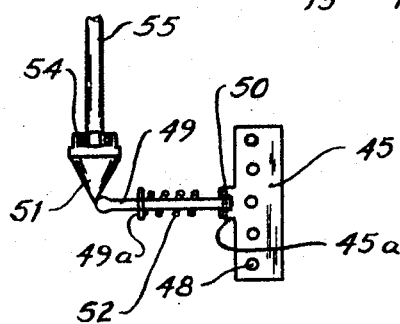
FIGURE 8 is an elevation view of elements of the manual radial piston control arrangement.
Figure 9:
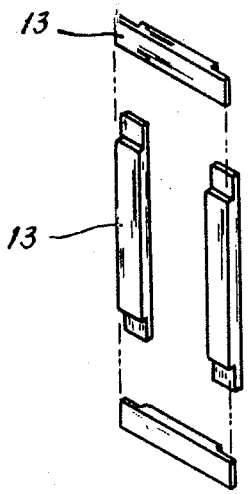
FIGURE 9 is a pictorial view of the piston/vane pressure sealing strips.
Figure 10:
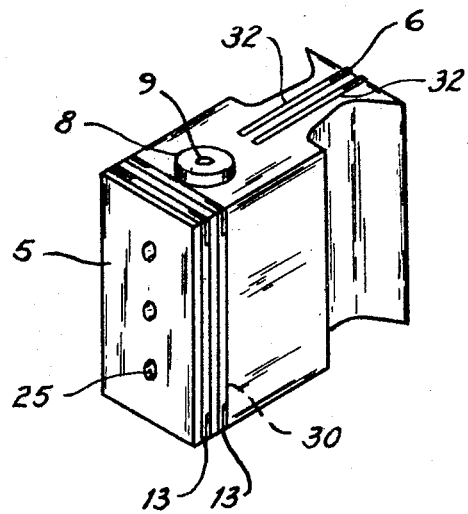
FIGURE 10 is a pictorial view of the typical piston/vane.

Referring now in more detail to the accompanying drawings, number 1 is the cylindrical housing. The cylindrical housing 1 contains the coolant holes 21 and the mounting tapped holes 22. The two end plates 2 and 3 are secured to the cylindrical housing 1 by the machine screws 20. The end plates 2 and 3 contain the coolant holes 23 and 24 respectively. The gaskets 7 provide a pressure seal and coolant seal between the cylindrical housing 1 and the end plates 2 and 3. The slotted rotor 4 is offset within the cylindrical housing 1 bore and supported by the drive shaft 11. The drive shaft 11 is supported by the two tapered roller bearings 10 fitted within the end plates 2 and 3. The two retainers 12 are secured to the end plates 2 and 3 with the screws 27, which retain the shaft seals 17 in place to keep dirt and grit from entering the engine at these points.

The rectangular key 18 secures the rotor 4 to the shaft 11 both radially and axially. The multiple piston/vanes 5 are closely fitted within the rotor slots 19 with both provided with a machine finish of RMS 16, or better. The piston/vane 5 width exactly matches the rotor 4 width and both are closely fitted within the cylindrical housing 1 and end plate 2 and 3 assembly.

The piston/vanes 5 are provided with two sealing grooves 30 in which the rectangular sealing strips 13, closely fit. The piston/vanes 5 are provided with baffling notches 28 at their upper vane portion ends and two pin holes 31 at each lower piston portion side. The pins 9 are tightly fitted into the pin holes 31 and support the bearings 8.

The piston/vanes 5 have multiple transfer holes 25 which run diagonally from the bottom to about midway in the piston portion. Several check valve cavities 40 are centrally located in the upper vane portion and are connected to the transfer holes 25 by the baffle bores 41, which are disposed at right angles to the check valve cavities 40. The jet bores 42 connect the upper ends of the check valve cavities to the upper vane jet side.

The centrifugal check valve 43 is closely retained in the check valve cavity 40 but free to move radially and is restrained from free outward radial movement by the coil spring 44.

The centrifugal check valve 43 lower end is provided with a small, precise cylindrical protrusion 43a, which acts as a gate or stop for the intersecting baffle bores 41 and thereby controls the radial pressure flow within the piston/vanes. The centrifugal check valves are provided with multiple side flutes 43b, which allow the pressure to flow through when the centrifugal check valve gate is opened.

The anti-friction rollers 8 are closely fitted into circular grooves 33 and 34 which are concentrically machined into the inside faces of the end plates 2 and 3 and which serve to guide and limit the piston/vane 5 radial displacement and insure that the vane tips clear the cylindrical housing 1 bore by from .001 to .005.

The vane portion of the piston/vanes are provided with multiple rectangular grooves 32, centrally located running along the top and two sides to about the midway point of the piston/vane height. The multiple interlocking sealing strips 6 are closely fitted into these rectangular grooves 32 and provide the pressure sealing for the vane portion in the rotary mode of operation.

The rectangular sealing strips 6 are made with precision half-lap end cuts so that they interlock at right angles with the adjacent sealing strip thereby forming a close sealing fit within the piston/vanes. These sealing strips 6 may be spring loaded with wave type spring strips if necessary.

The rectangular piston portion sealing strips 13 are made with precision half-lap end cuts so that they interlock at right angles with the adjacent sealing strip and thereby form a continuous seal around the piston portion of the piston vane. These sealing strips may also be spring loaded with wave type spring strips if necessary.

An alternate piston/vane design consists of the basic piston/vane 5, previously described with the omission of the multiple transfer holes and centrifugal check valves, and would be used where the engine rotor 4, is provided with radial transfer bores 26 for gaining a jet effect at the rotor periphery.

In the manual or external control of operational mode change a gate 45 moves radially in a close slot 46 which intersects the multiple radial transfer bores 45 within the rotor 4.

The radial transfer bores 26 connect the lower end of the piston/vane rotor slots 19 with the rotor periphery and may be manufactured with offsets where necessary to gain proper pressure flow direction.

The gate 45 is provided with multiple holes 48 which lines up with the multiple radial transfer bores 47 and are arranged to alternately open and close the transfer bore passage as the gate is moved radially.

The gate 45 is provided with two centrally located lugs 45a, at one side which connects the gate to the tie rod 49 by means of the tie pin 50.

The other end of the tie rod 49, is in contact with a conical cam 51 located within the hollow shaft 11. The tie rod 49 has a flange 49a about midway along its length which contacts the spring 52 nested within the rotary cavity 53.

The spring 52 keeps the tie rod 49 engaged with the conical cam 51 surface. The conical cam 51 has a close sliding fit within the bore of the shaft 11, and should revolve with the shaft 11.

A ball bearing 54 is fitted within the upper portion of the conical cam 51 and connects the conical cam to the vertical control rod 55, which does not revolve.

In operation, when the conical cam 51 is in the upper position, the gate 45 is in an inboard closed position so that the transfer bores 47 are blocked off and the engine operates in the radial piston mode.

When the conical cam 51, is in the lower position the holes 48, in the gate 45 are lined up with the multiple transfer bores 47 which allows the air pressure to pass through to the periphery of the rotor 4, and the engine operates in the rotary vane mode.

The cylindrical housing 1 is provided with multiple spark plugs 16, which are uniformly mounted over the combustion cavity at about a mean angle of 25 degrees off side dead center in either direction of rotation, as required. The cylindrical housing 1 bore is provided with combustion pockets or cavities 35 and which nest the spark plug electrodes and aid in swirling the fuel/air mixture during combustion.

Both the rotor 4 faces and the inside surfaces of the end plates, 2 and 3 are provided with a machine finish of RMS 16 or better, and are treated with a low friction film.

The cylindrical housing 1 has multiple exhaust ports 14 tangentially disposed at the side of the housing approximately 125 degrees, mean, from the spark plugs mean center, to carry out the exhaust gases after the power phase is expended. Axial intake ports 15, are placed in either or both of the end plates 2 and 3 approximately opposite from the center of the spark plug array.

Intake ports 15a may be tangentially located within the cylindrical housing for some applications where priming and supercharging are desirable.

Intake ports 37 are located in either or both of the end plates 2 and/or 3, at about the same angular positions as the intake ports 15, but over the lower piston portion intake cavity area, A.

Exhaust port 36, are located in both end plates 2 and 3, at about the same angular position as the exhaust ports 14, but positioned over the lower piston portion exhaust cavity area, B.

Liquid coolant jackets 56, are mounted on the end plates 2 and 3.

The end plates 2 and 3, are fitted with spark plugs 16 at the same mean angular location of the spark plugs 16, fitted inside cylindrical housing 1.

Mounting of the engine would be accomplished by utilizing the outer surface of the bottom end plate 3, and securing the engine to the mounting means with some of the multiple screws 20.

The distributor system, which is not shown nor described for clarity would be divided into two sections which would synchronize both radial and rotary spark plug groups, and would allow either one or the other group of plugs to function independently or together.

The vertical control rod 55 may be synchronized with the distributor sections so that the mode functions coincide properly.

Most of the accessory units necessary for the operation of a standard I.C. reciprocating engine, such as fuel supply, exhaust systems, alternator, coolant pump and the like, would be applicable to the radial/rotary I.C. engine and are not shown for the sake of simplicity in the specifications, and drawings.

What is claimed is:

1. In a rotary internal combustion engine, a cylindrical housing with vertical axis, a circular cavity within said cylindrical housing, a multiple slotted rotor at near zero clearance at one point of said cavity, multiple radially disposed wide piston/vanes closely fitted within the slots of the said slotted rotor, multiple hollow cylindrical cavities near the midlength of the multiple wide piston/vanes, multiple transfer holes disposed from the bottom surface extending to the said multiple hollow cylindrical cavities, multiple holes communicating with the upper end of the hollow cylindrical cavities to the upper side of the said piston/vanes, coil springs disposed above miniature check plugs within the said multiple hollow cylindrical cavities, two end plates secured at the top and bottom of the said cylindrical housing, sealing and shimming means disposed between the said cylindrical housing and end plates, exhaust ports tangentially disposed at the opposite side of the large crescent-shaped cavity, a vertical drive shaft secured to the said slotted rotor, bearing means within said end plates supporting said vertical drive shaft, multiple radially disposed spark plugs secured to the outside of the said cylindrical housing, multiple axially disposed spark plugs secured to the said two end plates, exhaust ports axially disposed near the center of said two end plates, intake ports axially disposed adjacent to the said exhaust ports within the said two end plates.

2. The combination set forth in claim 1 including multiple precision end-lapped interlocking sealing strips disposed within multiple matching grooves along the top and sides of the said piston/vanes, multiple precision end-lapped interlocking sealing strips disposed within multiple matching grooves disposed around the base of the said piston/vanes.

3. In a rotary internal combustion engine, a cylindrical housing with vertical axis, a circular cavity within said cylindrical housing, a multiple slotted rotor at near zero clearance at one point of said circular cavity, multiple generally radically disposed transfer holes placed between the base of said slots and the periphery of the said multiple slotted rotor, stop gates intersecting the transfer holes near the base of said slots, control rod means connecting the stop gate and radially disposed from the engine center point, multiple radially disposed wide piston/vanes closely fitted within the slots of the said slotted rotor, two end plates secured at the top and bottom of the said cylindrical housing, sealing and spacing means disposed between the said cylindrical housing and end plates, exhaust ports tangentially disposed at one side over the center line of the said cylindrical housing, intake ports tangentially disposed at the opposite sides over the center line of the said cylindrical housing, a hollow vertical drive shaft secured to the slotted rotor, a conical cam disposed within the said hollow vertical drive shaft in pivotal association with a vertical control shaft, coil spring means over said control rod holding said control rod in contact with said conical cam, bearing means within said end plates supporting said vertical drive shaft, multiple radially disposed spark plugs secured to the outside of the said cylindrical housing, multiple axially disposed spark plugs secured to the said two end plates, exhaust ports axially disposed over the center of said two end plates, intake ports axially disposed adjacent to the exhaust ports within the said two end plates.

4. The combination set forth in claim 3 wherein the multiple radially disposed piston/vanes are solid with no internal transfer holes and internal cavities.

5. The combination set forth in claim 1 wherein the multiple radially disposed piston/vanes provided with multiple hollow cylindrical cavities, multiple transfer holes disposed from the bottom to the hollow cylindrical cavities, multiple jet bores communicating with the upper end of the hollow cylindrical cavities from the side of the said piston/vanes, said piston/vanes are split on the longitudinal center line across the width forming two identical halves, joining means for said piston/vanes halves.

6. The combination set forth in claim 3 wherein the said multiple radially disposed spark plugs secured to the outside of the said cylindrical housing are provided with shaped cavities on the inside of the said cylindrical housing.

References Cited
UNITED STATES PATENTS

| | | | |
|---|---|---|---|
| 2,688,924 | 9/1954 | Links | 123—16 XR |
| 3,181,512 | 5/1965 | Happeman | 123—16 |
| 3,301,232 | 1/1967 | Eickmann | 123—16 |
| 3,301,233 | 1/1967 | Dotto et al. | |
| 3,352,291 | 11/1967 | Brown | 123—16 |
| 3,398,725 | 8/1968 | Null | 123—16 |

C. J. HUSAR, Primary Examiner

U.S. Cl. X.R.

103—161